(12) United States Patent
Reed et al.

(10) Patent No.: US 9,464,534 B2
(45) Date of Patent: Oct. 11, 2016

(54) TURBINE PURGE FLOW CONTROL SYSTEM AND RELATED METHOD OF OPERATION

(71) Applicant: General Electric Company, Schenectady, NY (US)

(72) Inventors: Robert Joseph Reed, Simpsonville, SC (US); Kevin Thomas McGovern, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 791 days.

(21) Appl. No.: 13/838,037

(22) Filed: Mar. 15, 2013

(65) Prior Publication Data

US 2014/0169938 A1    Jun. 19, 2014

Related U.S. Application Data

(60) Provisional application No. 61/737,240, filed on Dec. 14, 2012.

(51) Int. Cl.
| | |
|---|---|
| *F01B 25/02* | (2006.01) |
| *F01D 11/00* | (2006.01) |
| *F02C 6/18* | (2006.01) |
| *F02C 9/18* | (2006.01) |
| *F01D 11/06* | (2006.01) |

(52) U.S. Cl.
CPC ............. *F01D 11/00* (2013.01); *F02C 6/18* (2013.01); *F02C 9/18* (2013.01); *F01D 11/06* (2013.01); *Y02E 20/16* (2013.01)

(58) Field of Classification Search
CPC .......... F01D 11/00; F01D 11/06; F02C 9/18; F02C 6/18; Y02E 20/16
USPC ........... 60/39.1, 782; 70/100; 415/1, 17, 26, 415/28–29, 47–50, 144, 145
See application file for complete search history.

(56) References Cited

U.S. PATENT DOCUMENTS

| | | | | |
|---|---|---|---|---|
| 5,857,321 | A * | 1/1999 | Rajamani | F02C 9/28 60/39.24 |
| 5,996,331 | A * | 12/1999 | Palmer | F02C 6/08 415/115 |
| 6,882,924 | B2 | 4/2005 | Miller | |
| 7,617,687 | B2 | 11/2009 | West et al. | |
| 7,784,288 | B2 | 8/2010 | Thatcher et al. | |
| 8,677,761 | B2 * | 3/2014 | Leach | F02C 9/18 60/39.091 |
| 2001/0018824 | A1 * | 9/2001 | Leone | F01D 25/12 60/772 |
| 2003/0046938 | A1 * | 3/2003 | Mortzheim | F01D 17/105 60/782 |
| 2007/0137213 | A1 * | 6/2007 | Rickert | F02C 7/125 60/782 |
| 2007/0199330 | A1 | 8/2007 | West et al. | |
| 2009/0056342 | A1 | 3/2009 | Kirzhner | |
| 2010/0215480 | A1 | 8/2010 | Leach et al. | |
| 2010/0286889 | A1 * | 11/2010 | Childers | F02C 6/08 701/100 |

(Continued)

*Primary Examiner* — Nicholas J Weiss
*Assistant Examiner* — Jason T Newton
(74) *Attorney, Agent, or Firm* — Ernest G. Cusick; Huffamn Warnick LLC (57) ABSTRACT

A system configured to precisely control and/or modulate purge flow in a power plant system (e.g., a gas turbine) during operation is disclosed. In one embodiment, a system includes: at least one computing device adapted to control a purge flow in a gas turbine by performing actions comprising: obtaining operational data from the gas turbine; determining an inferred gas path pressure value for the gas turbine; determining an allowable purge flow for the gas turbine as a function of the operational data and the inferred gas path pressure value; and adjusting the purge flow based upon the allowable purge flow determination.

15 Claims, 7 Drawing Sheets

(56) References Cited

U.S. PATENT DOCUMENTS

| | | | | |
|---|---|---|---|---|
| 2013/0104816 A1* | 5/2013 | Nenmeni | ................ | F01K 23/10 122/504 |
| 2013/0187007 A1* | 7/2013 | Mackin | .................... | F02C 6/08 244/134 R |
| 2015/0059355 A1* | 3/2015 | Feigl | ........................ | F02C 7/18 60/782 |
| 2015/0159561 A1* | 6/2015 | Seely | ....................... | F02C 9/18 60/782 |

* cited by examiner

TURBINE PURGE FLOW CONTROL SYSTEM AND RELATED METHOD OF OPERATION

CROSS REFERENCE TO RELATED APPLICATIONS

This application claims the benefit of U.S. Provisional Application Ser. No. 61/737,240 filed on Dec. 14, 2012, and entitled "TURBINE PURGE FLOW CONTROL SYSTEM AND RELATED METHOD OF OPERATION", which is incorporated by reference herein in its entirety.

SCOPE OF THE INVENTION

The subject matter disclosed herein relates to power plant systems and, more particularly, to purge flow control systems for gas turbines and a related method of operation.

BACKGROUND OF THE INVENTION

The operation of some power plant systems, for example certain simple-cycle and combined-cycle power plant systems, include the use of gas turbines. The operation of a gas turbine includes the use of pressurized gas flows at extreme temperatures traveling through flowpaths of the gas turbine, these pressurized gas flows driving a rotor of the turbine (e.g., power generation). Exposure of some components of the gas turbine (e.g., those not in the flowpath, wheel spaces, etc.) to these pressurized gas flows may reduce system/component lifespan and decrease system efficiency. As a result, interfaces between the flowpath and other portions of the gas turbine may include tight clearances which limit leakage/ingestion of hot gases (e.g., back flow) throughout the gas turbine.

In some systems, a purge flow may be introduced to one side of these interfaces to control leakage between the flowpath and other portions of the gas turbine (e.g., rotor back flow margin, wheel space back flow margin, etc.) by creating a targeted pressure ratio across the interface. This purge flow increases a pressure on one side of the interface relative to the other side, creating the targeted pressure ratio such that gas flow will only travel from the high pressure side to the low pressure side. However, as it is difficult to obtain rotating pressure measurements of the gas turbine during operation, and gas turbines operate across a wide range of external and internal conditions (e.g., temperatures, speeds, pressures, etc.), these systems may be limited to open looped control of the purge flow supply. This openlooped control operating substantially blind to operating conditions (e.g., environmental factors, cold-day performance, etc.), and requiring a maximum (e.g., worst-case scenario) amount of purge flow to be supplied to the gas turbine at all times to insure that the necessary pressure gradient exists across the interface. As such, purge flow requirements may be conservative resulting in losses in system efficiency and a demand for purge flow which is greater than necessary.

BRIEF DESCRIPTION OF THE INVENTION

Systems for controlling the purge flow in a power plant system are disclosed. In one embodiment, a system includes: at least one computing device adapted to control a purge flow in a gas turbine by performing actions comprising: obtaining operational data from the gas turbine; determining an inferred gas path pressure value for the gas turbine; determining an allowable purge flow for the gas turbine as a function of the operational data and the inferred gas path pressure value; and adjusting the purge flow based upon the allowable purge flow determination.

A first aspect of the invention provides a system including: at least one computing device adapted to control a purge flow in a gas turbine by performing actions comprising: obtaining operational data from the gas turbine; determining an inferred gas path pressure value for the gas turbine; determining an allowable purge flow for the gas turbine as a function of the operational data and the inferred gas path pressure value; and adjusting the purge flow based upon the allowable purge flow determination.

A second aspect of the invention provides a program product stored on a non-transitory computer readable medium, which when executed by at least one computing device, performs the following: obtains operational data from a gas turbine during operation; determines an inferred gas path pressure value for the gas turbine; determines an allowable purge flow for the gas turbine based on the operational data and the inferred gas path pressure value to; and adjusts the purge flow based upon the allowable purge flow determination.

A third aspect of the invention provides a combined cycle power generation system including: a gas turbine; a generator operatively connected to the gas turbine; and at least one computing device connected to the gas turbine and configured to adjust a purge flow to the gas turbine by performing actions comprising: obtaining operational data from the gas turbine; determining an inferred gas path pressure value for the gas turbine; determining an allowable purge flow for the gas turbine as a function of the operational data and the inferred gas path pressure value; and adjusting the purge flow based upon the allowable purge flow determination.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the disclosure may not necessarily be to scale. The drawings are intended to depict only typical aspects of the disclosure, and therefore should not be considered as limiting the scope of the disclosure. It is understood that elements similarly numbered between the FIGURES may be substantially similar as described with reference to one another. Further, in embodiments shown and described with reference to FIGS. 1-7, like numbering may represent like elements. Redundant explanation of these elements has been omitted for clarity. Finally, it is understood that the components of FIGS. 1-7 and their accompanying descriptions may be applied to any embodiment described herein.

DETAILED DESCRIPTION OF THE INVENTION

As indicated herein, aspects of the invention provide for systems configured to precisely control, reduce, and/or modulate purge flow (e.g., flow percentage) in a power plant system (e.g., a gas turbine) during operation. These systems modulate a targeted pressure ratio across an interface of a gas turbine by controlling a purge flow based on a measurement of the gas flow from an extraction point (e.g., a compressor extraction point, an extraction valve, etc.) and a model of gas turbine operation. In contrast to conventional systems, which may require purge flows with pressures which are significantly greater than that of the turbine gas flow, embodiments of the current invention provide for a system which predicts and considers the effects of purge flow variations on gas turbine operation and component lifespan during operation based on turbine/operational data (e.g., real-time pressure readings) obtained from an extraction point.

The system includes a computing device which is communicatively connected to a database/memory/storage system and at least one sensor disposed proximate the extraction point. The computing device is configured to identify an allowable purge flow range for the gas turbine based upon a gas turbine model and the operational data (e.g., a pressure value) obtained at the extraction point. This purge flow range may meet the rotor back flow margin limit for the gas turbine and be determined based on the static pressure reading at the extraction point and an inferred gas path pressure calculated from the turbine model. Once the range has been identified, the computing device considers the gas turbine operating condition(s) necessary to achieve the various purge flows within the range, and adjusts gas turbine operation and/or purge flow so as to optimize performance, rotor lifespan, and reliability. In an embodiment, the computing device may determine a ratio of measured static pressure at the extraction point to a calculated gas path total pressure in order to determine a requisite purge flow for the gas turbine. As a result, embodiments of the purge flow control system described herein may require adjustable purge flows to minimize pressure ratio of (wheel space pressure)/(gas flow pressure).

As used herein, the terms "axial" and/or "axially" refer to the relative position/direction of objects along axis A, which is substantially perpendicular to the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location.

Figure 1:
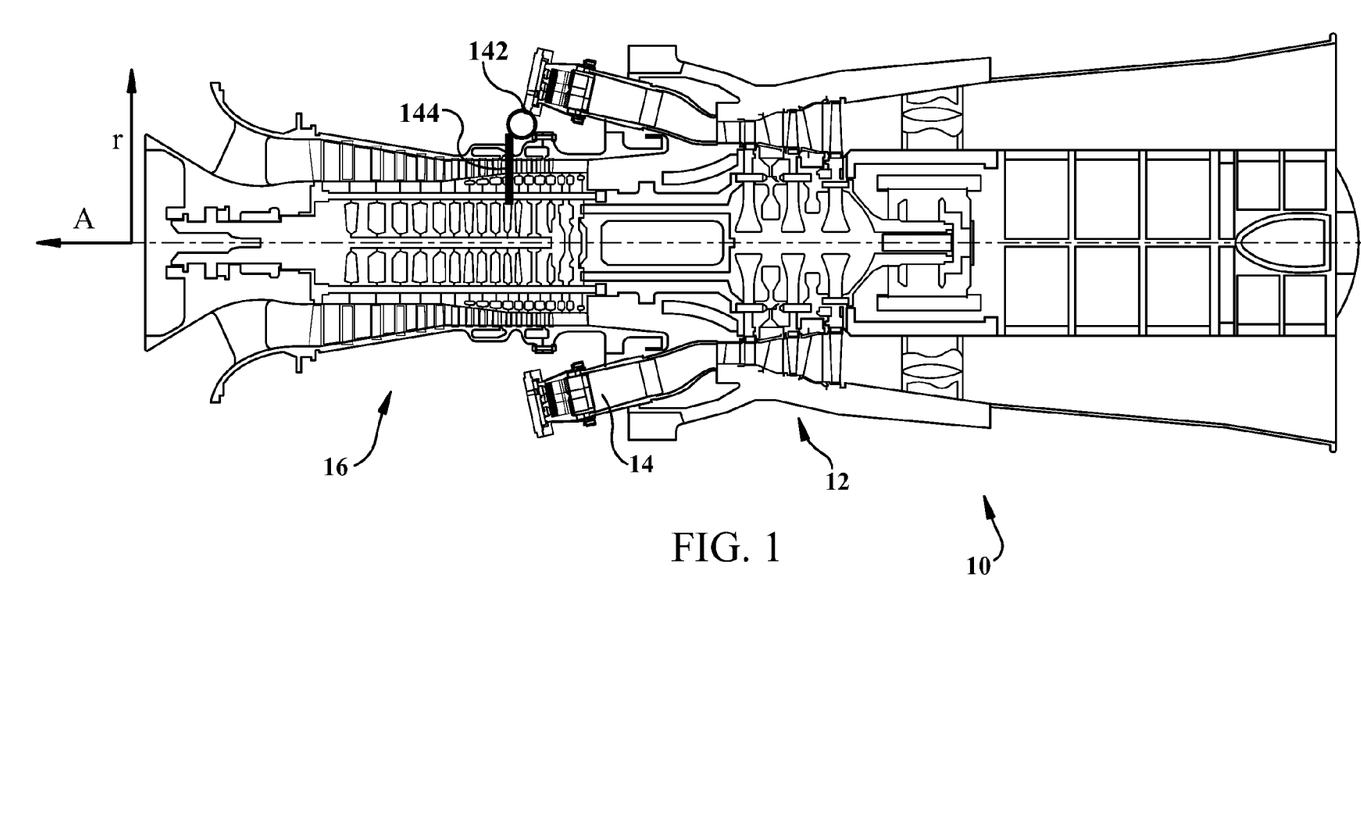
FIG. 1 shows a three-dimensional partial cut-away perspective view of a portion of a gas turbine according to an embodiment of the invention.

Turning to the FIGURES, embodiments of systems and devices are shown, which are configured to precisely control, reduce, and/or modulate purge flow in a power plant system (e.g., a gas turbine) during operation. Each of the components in the FIGURES may be connected via conventional means, e.g., via a common conduit or other known means as is indicated in FIGS. 1-7. Referring to the drawings, FIG. 1 shows a perspective partial cut-away illustration of a gas turbine 10, which will be used to describe an exemplary application of the present invention. It will be understood by those skilled in the art that the present invention is not limited to this type of usage. As stated, the present invention may be used in gas turbine engines, such as the engines used in power generation and airplanes, steam turbine engines, and other types of rotary engines and dynamoelectric machines. In general, gas turbine engines operate by extracting energy from a pressurized flow of hot gas that is produced by the combustion of a fuel in a stream of compressed air. As illustrated in FIG. 1, gas turbine 10 may be configured with an axial compressor 16 that is mechanically coupled by a common shaft or rotor to a downstream turbine section 12, and a combustor 14 positioned between the compressor 16 and the turbine section 12.

In an embodiment, a sensor 142 (e.g., a pressure sensor, a thermometer, a transducer, etc.) may be disposed proximate an extraction point 144 in gas turbine 10. Sensor 142 may obtain operational data 134 (e.g., pressure readings, static pressure readings, etc.) from turbine section 12, compressor 16, and/or a gas traveling therein via extraction point 144. It is to be understood that turbine 10 is shown as one example only, and each turbine may have any number of stages and/or extraction points. Also, as will be described herein, the teachings of the invention do not require a multiple stage turbine. It is further understood that while extraction point 144 and/or sensor 142 are shown disposed proximate compressor 16 of gas turbine 10, that sensor 142 and/or extraction point 144 may be disposed at any point in gas turbine 10 or a compressor in accordance with embodiments described herein.

Figure 2:
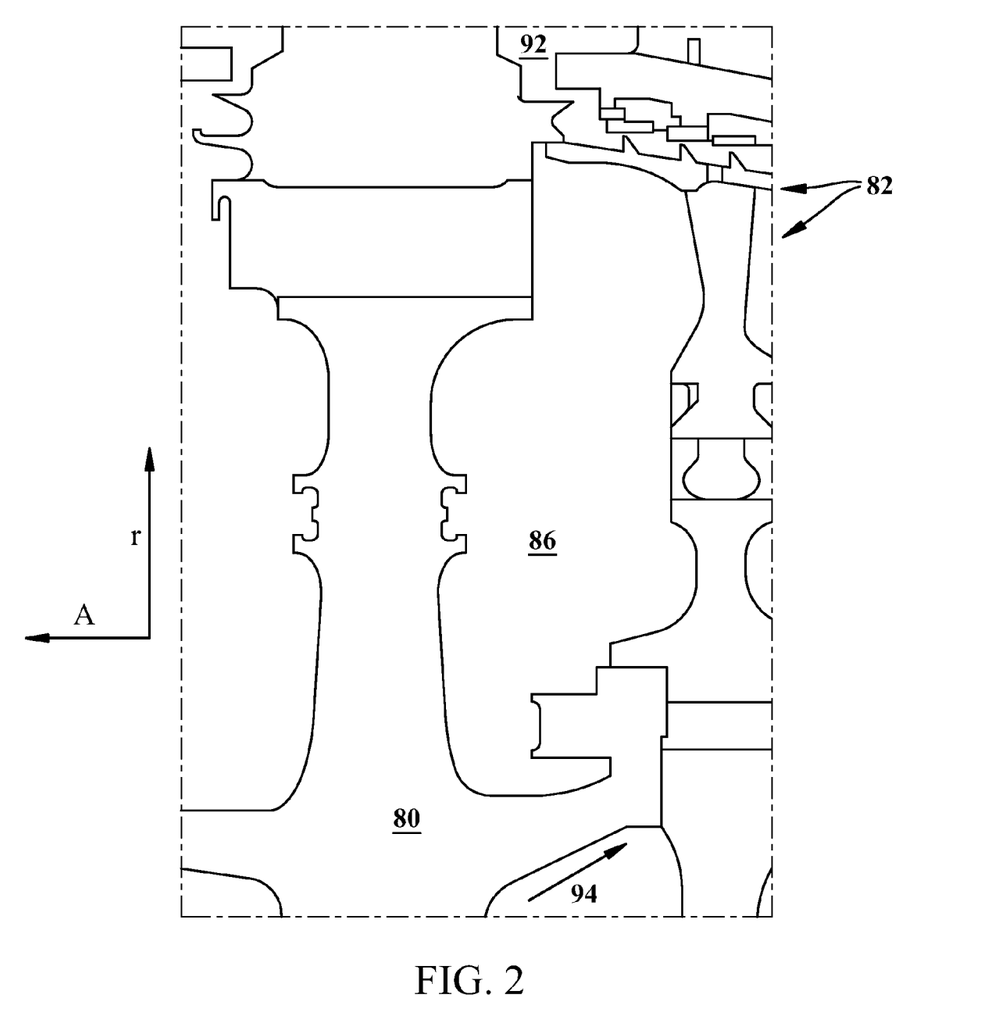
FIG. 2 shows a partial cut-away view of a portion of a gas turbine according to an embodiment of the invention.

Turning to FIG. 2, a schematic cut-away illustration of a portion of turbine 10 is shown including a seal cavity 86 and an interface seal 82 according to embodiments of the invention. Seal cavity 86 may be located below a turbine flowpath 92 and between a rotor post 80 and an interface seal 82 of turbine 10. In an embodiment, seal cavity 86 may be pressurized via a purge flow 94 which is controlled by a computing device 110 and/or a purge flow control system 107 (shown in FIG. 3). Flow path seal cavity 86 may be pressurized to a level higher or lower than a pressure of turbine flowpath 92, thereby controlling a direction of leakage flow (e.g., back flow margin) through interface seal 82.

Figure 3:
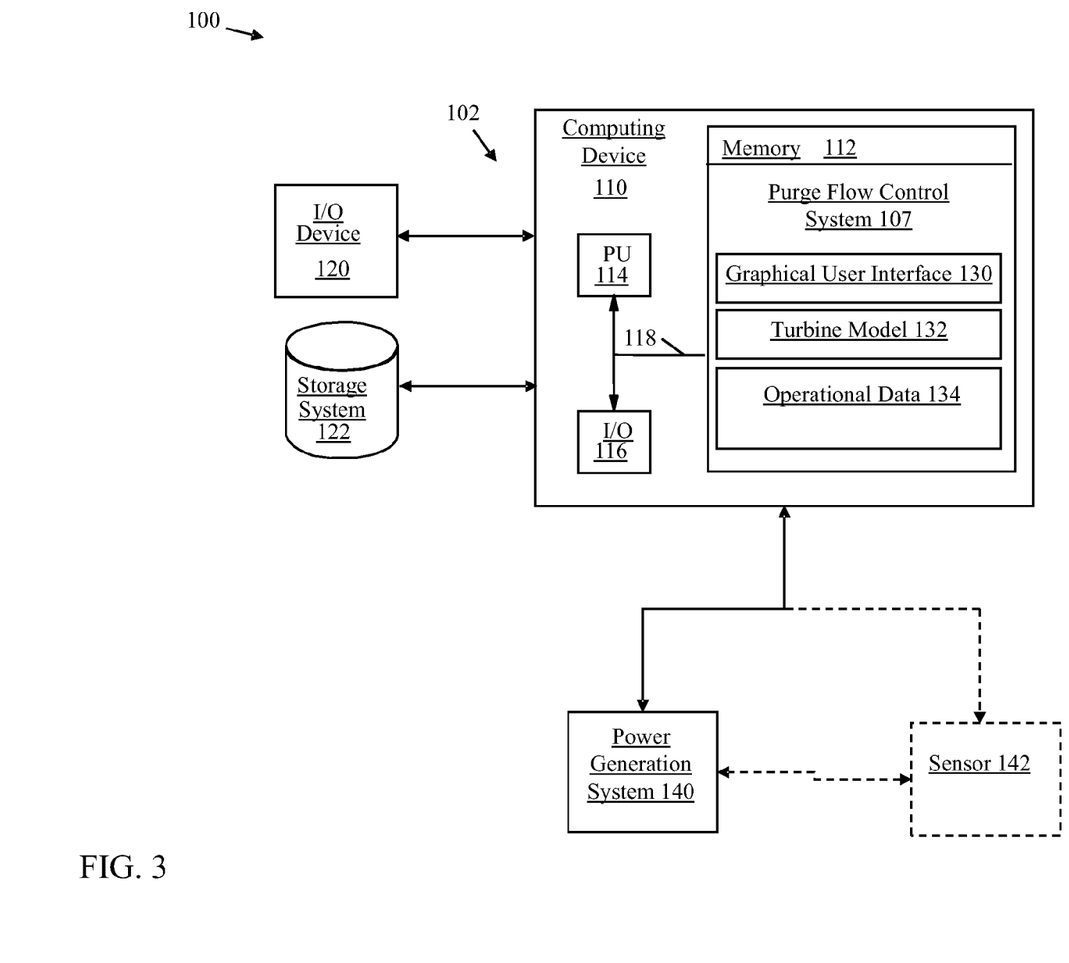
FIG. 3 shows a schematic illustration of an environment including a control system in accordance with an embodiment of the invention.

Turning to FIG. 3, an illustrative environment 100 including a purge flow control system 107 is shown according to embodiments of the invention. Environment 100 includes a computer infrastructure 102 that can perform the various processes described herein. In particular, computer infrastructure 102 is shown including computing device 110 which includes purge flow control system 107, which enables computing device 110 to manage purge flow to a gas turbine of a power generation system 140 by performing the process steps of the disclosure. In an embodiment, purge flow control system 107 may reduce an amount of purge flow required to manage wheel space back flow margin in gas turbine 10 (shown in FIG. 1).

As previously mentioned and discussed further below, purge flow control system 107 has the technical effect of enabling computing device 110 to perform, among other things, the purge flow control operations described herein. It is understood that some of the various components shown in FIG. 3 can be implemented independently, combined, and/or stored in memory for one or more separate computing devices that are included in computing device 110. Further, it is understood that some of the components and/or functionality may not be implemented, or additional schemas and/or functionality may be included as part of purge flow control system 107.

Computing device 110 is shown including a memory 112, a processor unit (PU) 114, an input/output (I/O) interface 116, and a bus 118. Further, computing device 110 is shown in communication with an external I/O device/resource 120 and a storage system 122. As is known in the art, in general, PU 114 executes computer program code, such as purge flow control system 107, that is stored in memory 112 and/or storage system 122. While executing computer program code, PU 114 can read and/or write data, such as graphical user interface 130 and/or operational data 134, to/from memory 112, storage system 122, and/or I/O interface 116. Bus 118 provides a communications link between each of the components in computing device 110. I/O device 120 can comprise any device that enables a user to interact with computing device 110 or any device that enables computing device 110 to communicate with one or more other computing devices. Input/output devices (including but not limited to keyboards, displays, pointing devices, etc.) can be coupled to the system either directly or through intervening I/O controllers.

In some embodiments, as shown in FIG. 3, environment 100 may optionally include at least one sensor 142 (shown in phantom) connected to power generation system 140 (e.g., a gas turbine) and computing device 110 (e.g., via wireless or hard-wired means). In an embodiment, during operation, sensor 142 may obtain operational data 134 (e.g., a static pressure measurement) from a gas turbine of power generation system 140 via extraction point 144 (shown in FIG. 1). Computing device 110 may process operational data 134 along with an inferred gas path pressure calculated from a turbine model 132 of the gas turbine (e.g., an onboard model) to determine a purge flow range/requisite amount of purge flow to the gas turbine. This requisite amount of purge flow may be specific to gas turbine operating conditions in real time and within a set of boundaries defined by turbine model 132, computing device 110, and/or a technician. Turbine model 132 may determine/generate an inferred gas path pressure value for power generation system 140 by considering operational characteristics (e.g., real time operational values, fluid temperatures, component temperature, turbine speed, flow speed, etc.) of power generation system 140. In one embodiment, turbine model 132 may determine inferred gas path pressure value based on gas path temperature and/or turbine speed. In another embodiment, turbine model 132 may determine inferred gas path pressure value based on historical data for power generation system 140.

In an embodiment, turbine model 132 may be self-calibrating to gas turbine 10 and may calculate real-time cycle parameters. In one embodiment, computing device 110 may consider a ratio of measured static pressure by sensor 142 and the gas path total pressure of power generation system 140 as calculated by turbine model 132, as feedback to control inlet bleed heat and/or internal guide vane orientation to a lower limit of said ratio. This manipulation of the inlet bleed heat and/or internal guide vane orientation may control purge flow to power generation system 140. In one embodiment, computing device 110 may obtain operational data 134 in real time and manipulate the purge flow in real time. Computing device 110 and purge flow control system 107 may substantially continuously adjust the purge flow during operation of the gas turbine in response to operating conditions, turbine model 132, changes in operational data 134 values, and/or demands. Sensor 142 may include any number of sensors as is known, including a pressure sensor, thermometer, gas turbine instruments, steam turbine instruments, etc. In some embodiments, computing device 110 and/or purge flow control system 107 may be disposed upon or within power generation system 140. Purge flow control system 107 and/or computing device 110 may be updateable and/or tunable during turbine operation, thereby accounting for differences in turbine designs and operation over time.

In an embodiment, turbine model 132 may include a plurality of operating characteristics of a compressor and/or turbine in power generation system 140. In one embodiment, turbine model 132 may be an onboard model which is self-calibrating to specific gas turbines and which calculates real-time cycle parameters.

In any event, computing device 110 can comprise any general purpose computing article of manufacture capable of executing computer program code installed by a user (e.g., a personal computer, server, handheld device, etc.). However, it is understood that computing device 110 is only representative of various possible equivalent computing devices that may perform the various process steps of the disclosure. To this extent, in other embodiments, computing device 110 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 110 may be/include a distributed control system. In another embodiment, computing device 110 may be integral to a gas turbine. In another embodiment, computing device 110 may be a part of power generation system 140.

Figure 4:
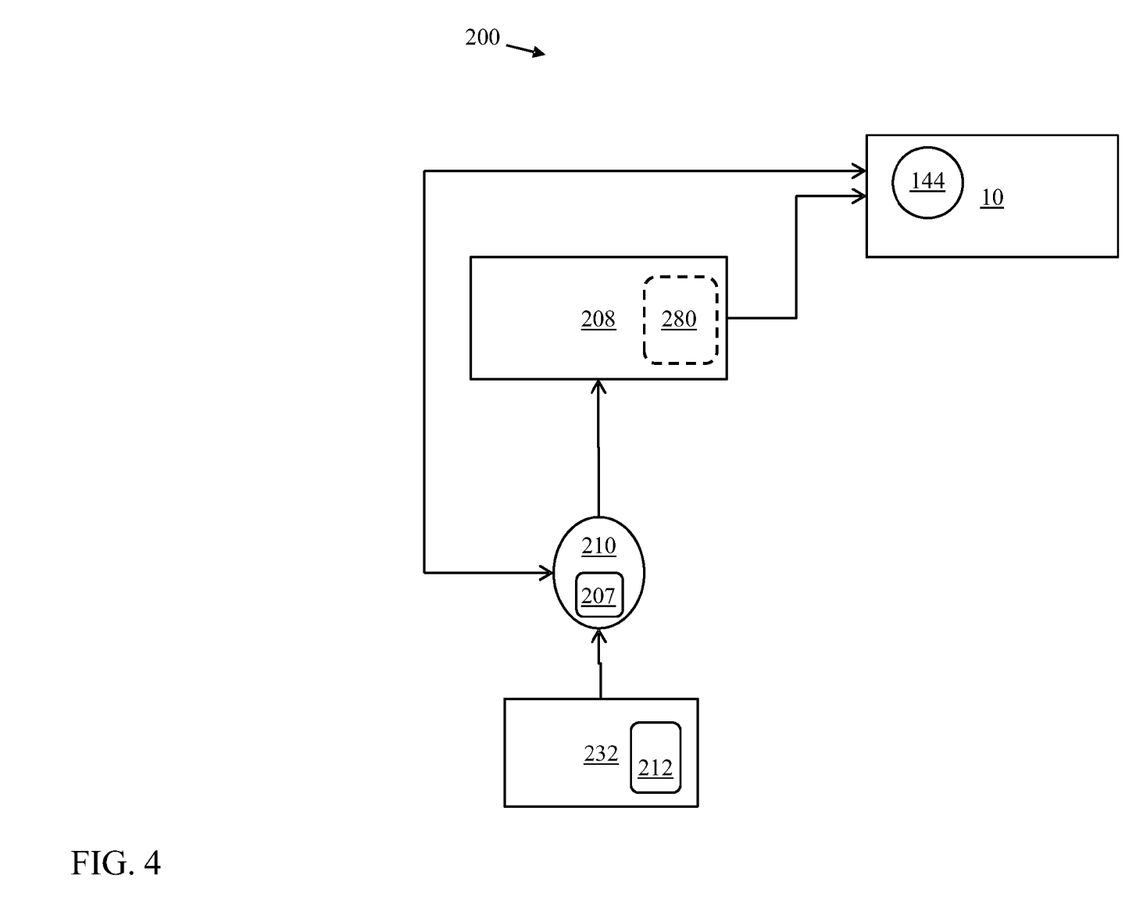
FIG. 4 shows a schematic illustration of a control system according to embodiments of the invention.

Turning to FIG. 4, a schematic illustration of a turbine system 200 including a computing device 210 and a purge flow control system 207 is shown according to embodiments. In an embodiment, computing device 210 is connected to a turbine model 232 which includes a plurality of turbine design characteristics and operating parameters (e.g., rotor limits, pressure limits, etc.). Turbine model 232 may determine/generate an inferred gas path pressure value 212 for turbine system 200 by considering operational characteristics (e.g., real time operational values, fluid temperatures, component temperature, turbine speed, flow speed, etc.) of turbine system 200. In one embodiment, turbine model 232 may determine inferred gas path pressure value 212 based on gas path temperature and/or turbine speed. In another embodiment, turbine model 232 may determine inferred gas path pressure value 212 based on historical data for turbine system 200. Computing device 210 may also be connected to an inlet guide vane 208 and/or an inlet bleed heat control system 280 (shown in phantom) which regulate(s) introduction of a purge flow into gas turbine 10. Computing device 210 may control/modulate a position/operation of inlet guide vane 208 and/or inlet bleed heat control system 280 based substantially on operational data obtained from an extraction point 144 and an inferred gas path pressure value 212 generated by turbine model 232. In one embodiment, an extraction pressure value (obtained through extraction point 144) and inferred gas path pressure value 212 may be combined in a ratio upon which computing device 210 may base operation and adjustment of inlet guide vane 208 and/or inlet bleed heat control system 280.

Figure 5:
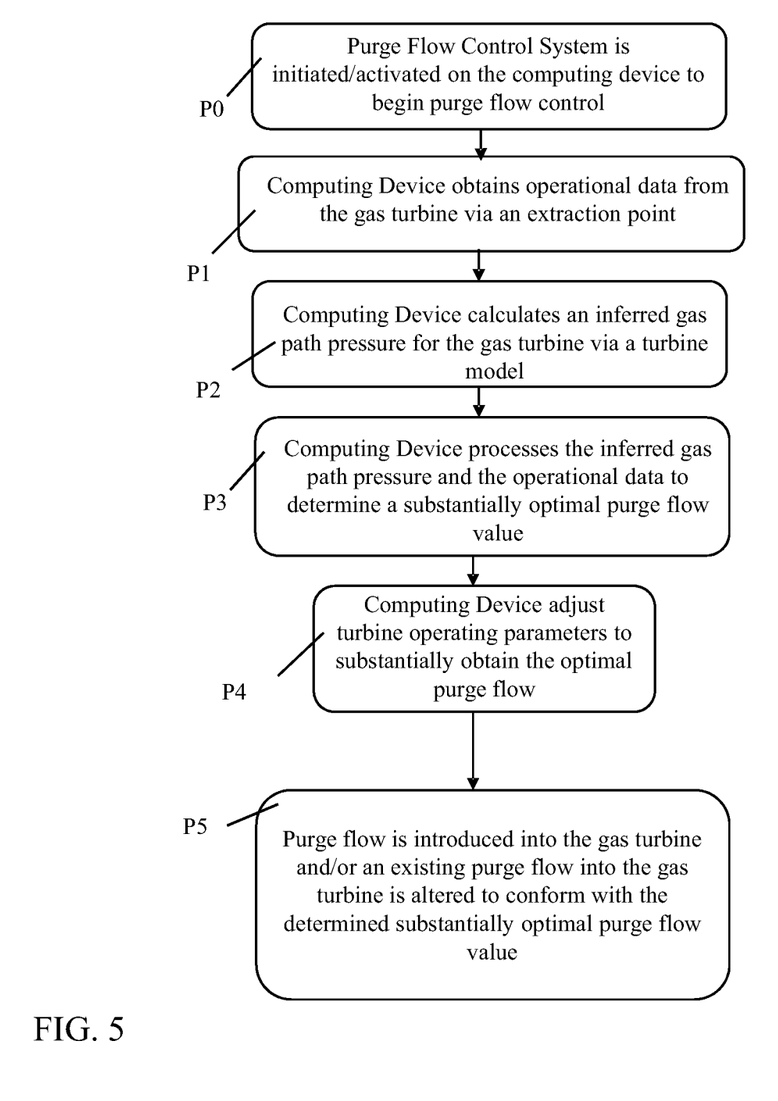
FIG. 5 shows a method flow diagram illustrating a process according to embodiments of the invention.

Turning to FIG. 5, an illustrative method flow diagram is shown according to embodiments of the invention: In pre-process P0, purge flow control system 107 is initiated on computing device 110 to begin purge flow regulation in a gas turbine during operation of power generation system 140. That is, either an automatic/scheduled adjustment to a position/operational state of inlet guide vane 208 of gas turbine 10 and/or inlet bleed heat control system 280 of gas turbine 10, a condition dictated adjustment to the position/operational state of inlet guide vane 208 and/or inlet bleed heat control system 280 of gas turbine 10, or a manual/user-commanded adjustment to the position/operational state of inlet guide vane 208 and/or an inlet bleed heat control system 280 of gas turbine 10 may be performed by computing device 110.

Following pre-process P0, in process P1, computing device 110 obtains operational data 134 from the gas turbine via an external extraction point 144 and a sensor 142. Operational data 134 may include a static pressure measurement, a set of system specifications for gas turbine 10/power generation system 140, a set of current ambient conditions at the power generation system 140, gas turbine stress, gas turbine expansion, etc.

Following process P1, in process P2, computing device 110 connects with turbine model 132 to calculate an inferred gas path pressure for gas turbine 10. Following the process of P2, in process P3, computing device 110 determines the allowable purge flow range based upon the operational data 134 and the inferred gas path pressure. In an embodiment, computing device 110 and/or PU 114 may generate a ratio 216 between operational data 134 and the inferred gas path pressure. Computing device 110 and/or PU 114 may evaluate this ratio to generate purge flow predictions and/or optimizations. Following P3, in process P4, computing device 110 adjusts the gas turbine operating parameter(s) to substantially attain the optimal purge flow to gas turbine 10. In an embodiment, computing device 110 may adjust purge flow control vanes 208 (e.g., inlet guide vanes) and/or inlet bleed heat system 280 based on the purge flow predictions and/or ratio 216. In one embodiment, computing device 110 may target a lower limit of the ratio. In one embodiment, computing device 110 may automatically adjust the gas turbine operating parameter(s). In another embodiment, computing device 110 may prompt and await user approval before adjusting the gas turbine operating parameter(s). In any event, following P4, in process P5, a purge flow is either introduced to the gas turbine 10 or an already existing purge flow to the gas turbine 10 is altered. The new or altered operational purge flow is introduced at a pressure substantially equivalent to the lower limit of the ratio 216.

The data flow diagram and block diagrams in the FIGURES illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
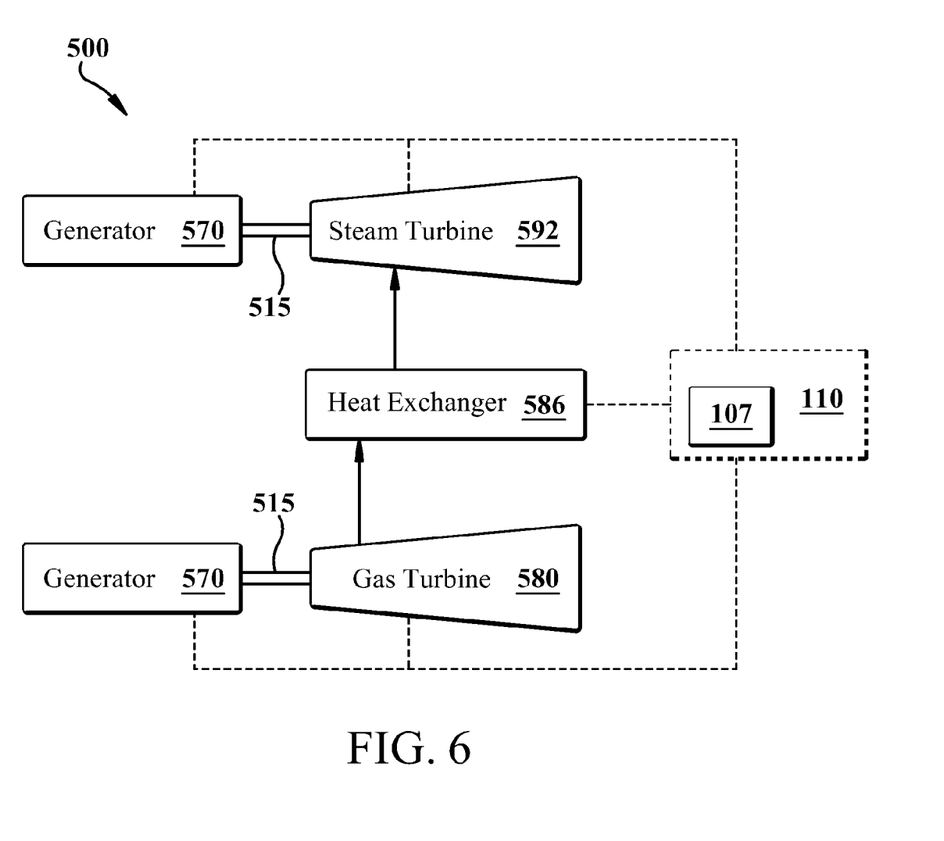
FIG. 6 shows a schematic view of portions of a multi-shaft combined cycle power plant in accordance with an aspect of the invention.
Figure 7:
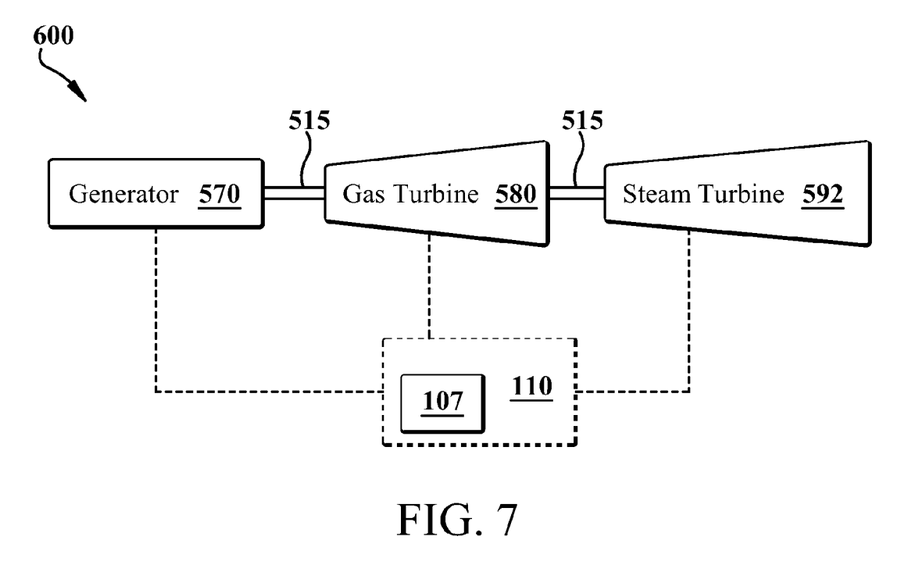
FIG. 7 shows a schematic view of portions of a single-shaft combined cycle power plant in accordance with an aspect of the invention.

Turning to FIG. 6, a schematic view of portions of a multi-shaft combined-cycle power plant 500 is shown. Combined-cycle power plant 500 may include, for example, a gas turbine 580 operably connected to a generator 570. Generator 570 and gas turbine 580 may be mechanically coupled by a shaft 515, which may transfer energy between a gas turbine 580 and generator 570. Also shown in FIG. 6 is a heat exchanger 586 operably connected to gas turbine 580 and a steam turbine 592. Heat exchanger 586 may be fluidly connected to both gas turbine 580 and steam turbine 592 via conventional conduits (numbering omitted). Heat exchanger 586 may be a conventional heat recovery steam generator (HRSG), such as those used in conventional combined-cycle power systems. As is known in the art of power generation, HRSG 586 may use hot exhaust from gas turbine 580, combined with a water supply, to create steam which is fed to steam turbine 592. Steam turbine 592 may optionally be coupled to a second generator system 570 (via a second shaft 515). Any of generator system 570, gas turbine 580, HRSG 586, and steam turbine 592 may be operably connected to purge flow control system 107 via computing device 110 of FIG. 3 or other embodiments described herein. It is understood that generators 570 and shafts 515 may be of any size or type known in the art and may differ depending upon their application or the system to which they are connected. Common numbering of the generators and shafts is for clarity and does not necessarily suggest these generators or shafts are identical. Generator system 570 and second shaft 515 may operate substantially similarly to generator system 570 and shaft 515 described above. In one embodiment of the present invention (shown in phantom), purge flow control system 107 may be used, via computing device 110 to operate either or both of steam turbine 592 and gas turbine 580. In another embodiment, shown in FIG. 7, a single-shaft combined-cycle power plant 600 may include a single generator 570 coupled to both gas turbine 580 and steam turbine 592 via a single shaft 515. Gas turbine 580 and steam turbine 592 may be operably connected to purge flow control system 107 via computing device 110 of FIG. 3 or other embodiments described herein.

As will be appreciated by one skilled in the art, the control system described herein may be embodied as a system(s), method(s), operator display (s) or computer program product(s), e.g., as part of a power plant system, a power generation system, a turbine system, etc. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module," "network" or "system." Furthermore, the present invention may take the form of a computer program product embodied in any tangible medium of expression having computer-usable program code embodied in the medium.

Any combination of one or more computer usable or computer readable medium(s) may be utilized. The computer-useable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The purge flow control system of the present disclosure is not limited to any one power generation system, combined cycle power generation system, turbine or other system, and may be used with other power systems. Additionally, the system of the present invention may be used with other systems not described herein that may benefit from the purge flow control operation provided by the purge flow control system described herein.

As discussed herein, various systems and components are described as "obtaining" and/or "transferring" data (e.g., operational data, component temperatures, system specifications, etc.). It is understood that the corresponding data can be obtained using any solution. For example, the corresponding system/component can generate and/or be used to generate the data, retrieve the data from one or more data stores or sensors (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    at least one computing device adapted to control a purge flow in a gas turbine by performing actions comprising:
        obtaining operational data from the gas turbine, wherein the operational data includes a static pressure measurement from an extraction point of the gas turbine;
        determining a gas path pressure value for the gas turbine using a turbine model within the at least one computing device, wherein the turbine model determines the gas path pressure value based upon at least one of a gas path temperature, a speed of the turbine, or historical data about the gas turbine;
        determining an allowable purge flow for the gas turbine as a function of the operational data and the inferred gas path pressure value; and
        adjusting the purge flow in the gas turbine based upon the allowable purge flow determination.

2. The system of claim 1, wherein the extraction point is disposed proximate a compressor section of the gas turbine.

3. The system of claim 1, wherein the processing the operational data and the gas path pressure value includes: determining a ratio of the operational data to the gas path pressure value.

4. The system of claim 1, further comprising a sensor connected to the at least one computing device and connected to the extraction point in the gas turbine, the sensor configured to obtain static pressure measurements for the gas turbine.

5. The system of claim 1, wherein the adjusting of the purge flow based upon the allowable purge flow determination includes at least one of: adjusting a purge flow valve connected to the gas turbine, adjusting an internal guide vane in the gas turbine, or adjusting inlet bleed heat to the gas turbine.

6. A program product stored on a non-transitory computer readable medium, which when executed by at least one computing device, performs the following:
   obtains operational data from a gas turbine during operation, wherein the operational data includes a static pressure measurement from an extraction point of the gas turbine;
   determines a gas path pressure value for the gas turbine using a turbine model within the at least one computing device, wherein the turbine model determines the gas path pressure value based upon at least one of a gas path temperature, a speed of the turbine, or historical data about the gas turbine;
   determine an allowable purge flow for the gas turbine as a function of the operational data and the gas path pressure value; and
   adjusts the purge flow in the gas turbine based upon the allowable purge flow determination.

7. The program product of claim 6, wherein the extraction point is disposed proximate a compressor section of the gas turbine.

8. The program product of claim 6, wherein the processing the operational data and the gas path pressure value includes: determining a ratio of the operational data to the gas path pressure value.

9. The program product of claim 6, wherein the operational data is obtained from a sensor connected to the at least one computing device and connected to the extraction point in the gas turbine, the sensor configured to obtain static pressure measurements for the gas turbine.

10. The program product of claim 6, wherein the adjusting of the purge flow based upon the allowable purge flow determination includes at least one of: adjusting a purge flow valve connected to the gas turbine, adjusting an internal guide vane in the gas turbine, or adjusting inlet bleed heat to the gas turbine.

11. A combined cycle power generation system comprising:
   a gas turbine;
   a generator operatively connected to the gas turbine; and
   at least one computing device connected to the gas turbine and configured to adjust a purge flow to the gas turbine by performing actions comprising:
      obtaining operational data from the gas turbine, wherein the operational data includes a static pressure measurement from an extraction point of the gas turbine;
      determining a gas path pressure value for the gas turbine using a turbine model within the at least one computing device, wherein the turbine model determines the gas path pressure value based upon at least one of a gas path temperature, a speed of the turbine, or historical data about the gas turbine;
      determining an allowable purge flow for the gas turbine as a function of the operational data and the gas path pressure value; and
      adjusting the purge flow in the gas turbine based upon the allowable purge flow determination.

12. The combined cycle power generation system of claim 11, wherein the extraction point is disposed proximate a compressor section of the gas turbine.

13. The combined cycle power generation system of claim 11, wherein the processing the operational data and the gas path pressure value includes: determining a ratio of the operational data to the gas path pressure value.

14. The combined cycle power generation system of claim 11 further comprising a sensor connected to the at least one computing device and connected to the extraction point in the gas turbine, the sensor configured to obtain static pressure measurements for the gas turbine.

15. The combined cycle power generation system of claim 11, wherein the adjusting of the purge flow based upon the allowable purge flow determination includes at least one of: adjusting a purge flow valve connected to the gas turbine, adjusting an internal guide vane in the gas turbine, or adjusting inlet bleed heat to the gas turbine.

\* \* \* \* \*